United States Patent [19]
Jain et al.

[11] Patent Number: 6,040,834
[45] Date of Patent: *Mar. 21, 2000

[54] CUSTOMIZABLE USER INTERFACE FOR NETWORK NAVIGATION AND MANAGEMENT

[75] Inventors: Sunil Jain; Robert Williams, both of Cary, N.C.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,289

[22] Filed: Dec. 31, 1996

[51] Int. Cl.$^7$ .............................. G06F 3/14; G06F 15/177
[52] U.S. Cl. ......................... 345/356; 345/357; 345/349; 345/969; 709/223
[58] Field of Search ..................................... 345/329, 356, 345/357, 349, 969, 970, 339; 395/200.53, 200.54; 709/223, 224

[56] References Cited

U.S. PATENT DOCUMENTS

| | | | |
|---|---|---|---|
| 5,276,789 | 1/1994 | Besaw et al. | 345/440 |
| 5,452,415 | 9/1995 | Hotka | 345/329 |
| 5,471,399 | 11/1995 | Tanaka et al. | 364/491 |
| 5,483,631 | 1/1996 | Nagai et al. | 345/329 |
| 5,515,487 | 5/1996 | Beaudet et al. | 345/440 |
| 5,559,955 | 9/1996 | Dev et al. | 395/182.02 |
| 5,751,962 | 5/1998 | Fanshier et al. | 395/200.53 |
| 5,751,965 | 5/1998 | Mayo et al. | 395/200.54 |

*Primary Examiner*—Raymond J. Bayerl
*Assistant Examiner*—Cuong T. Thai
*Attorney, Agent, or Firm*—McDermott, Will & Emery

[57] ABSTRACT

A graphical user interface for network management permits a network manager to select a limited number of network components to be displayed, along with the information relative thereto, while removing the display of undesirable or unnecessary data. Information is provided to inform the network manager that connections to other components may exist. In addition, information regarding the relationship of other components connected to the selected components is displayed. The network manager is provided with the opportunity to navigate about the map which illustrates the network topology, to locate the source of a problem. If the relationship between components changes, the network manager can expand the information displayed on the screen, to view all of the components that are directly connected to an illustrated component associated with a problem. The network manage can continue to request the display of specific connections, until the component which is the source of the problem is itself displayed and identified. Once the problem has been corrected, the manager can collapse the view to the originally selected components.

31 Claims, 6 Drawing Sheets

CUSTOMIZABLE USER INTERFACE FOR NETWORK NAVIGATION AND MANAGEMENT

FIELD OF THE INVENTION

The present invention is directed to the management of computer networks, and more particularly to a graphical user interface that provides flexibility for network managers in monitoring the operation of computer networks.

BACKGROUND OF THE INVENTION

As the use of computers becomes more ubiquitous for a large variety of tasks, the need to exchange information between computers also increases. As a result, networks for interconnecting computers, to allow such exchange of information, continue to grow. This growth occurs not only in the number of networks, but also in their size, as evidenced by the expanding use of local area networks (LANs), wide area networks (WANs), enterprise-wide networks (which might include several WANs) and, ultimately, world-wide networks, such as the internet.

To ensure reliable communications between computers, the networks themselves must be regularly managed. In general, the management of a network involves continued monitoring of the operating state of components which form the network, controlling those components to provide optimal performance under varying conditions, and troubleshooting sources of problem on the network. To this end, various operating models have been proposed for network management. In the operation of these models, information pertaining to the performance of components in the network is obtained, for example by management agents running on those components, and provided to a management process via an established protocol. For example, the SNMP (simple network management protocol) was developed for networks which operate on the basis of the internet protocol (IP or TCP/IP). Similarly, OSI-based networks employ the common management information protocol (CMIP) to transfer information regarding the operation of the network. This information is reported to a management process running on a central station which could be, for example, the main server on a given network. In essence, the management process provides a network manager with a list of all of the components on the network, e.g., routers, bridges, repeaters and the like, along with information regarding their configuration, operational status, and the like.

To facilitate the network manager's understanding of information provided by a management process, various application programs have been developed which display at least some of the information gathered by the process in a graphical format. One particularly useful type of application provides a map of the network topology. In the operation of this type of application, the network manager can view a display which illustrates all of the nodes on the network, as well as their interconnections. With this type of display, when the network manager receives information that a particular node has gone down, i.e., become non-operational, or that its performance has somehow degraded, he is able to immediately visualize the portions of the network which are affected by the drop in performance, and take appropriate corrective action. Examples of such applications include CiscoWorks Blue Logical Maps by Cisco Systems, Inc., OpenView by Hewlett Packard and NetManager by Sun Microsystems.

For networks of any appreciable size, the utility of these graphical interface programs is inversely related to the size of the networks on which they are used. For example, in a local area network or a relatively small wide area network having a few routers, the number of network components to be managed is sufficiently limited that they can all be displayed on the screen of a computer monitor, along with their interconnections, in a readily comprehensible manner. However, as the number of network components grows with the increasing size of the network, the display of all of those components becomes more complex. This complexity is due to the fact that the monitor screen becomes increasingly crowded as more icons, or the like, are added to the map to illustrate the additional network components. Furthermore, the interconnections between these components can increase exponentially, and their illustration can result in such a "busy" appearance to the screen that the information contained therein becomes incomprehensible.

It is often the case that a network manager does not need to know about the existence and state of all components in an overall network, particularly in the case of large WANs and enterprise networks. Rather, the network manager may only be responsible for a small portion of the total network, such as a few key routers and the components directly connected thereto. In such a case, the information provided by a graphical network management tool which illustrates the topology of the entire network is of little value to the network manager. It is desirable, therefore, to provide a graphical user interface for network management which permits the network manager to customize the displayed information in a manner which limits it to that which is particularly useful to the manager, and yet which provides the flexibility to navigate to any given area of the network to obtain all information necessary to properly carry out management duties.

SUMMARY OF THE INVENTION

In accordance with the present invention, a graphical user interface is provided which permits a network manager to select a limited number of network components for display in a topological map, along with pertinent information relating thereto, while removing the display of undesirable or unnecessary data. In operation, a network manager can select a few key routers in an overall network, and have only those routers, and their interconnections, displayed on the screen of the computer monitor. Other components connected to those routers, which have not been selected by the network manager, are not displayed. However, information is provided to inform the network manager that other connections to those routers may exist. In addition, information relating to the performance between the key routers and other components connected to the key routers is also displayed. For example, if all of the connections are properly operating, the key routers can be displayed with one color. If, however, a connection to a key router goes down, the color of its display is changed, to provide an immediate indication to the network manager.

As a second feature of the invention, the network manager is provided with the opportunity to navigate about the map of the network topology, to locate the source of a problem. If the color of an illustrated component changes, to illustrate the existence of a problem, the network manager can expand the information displayed on the screen, by requesting to view all of the components that are directly connected to the illustrated router associated with the problem. The network manager can continue to request the display of specific connections, until the component which is the source of the problem is itself displayed and identified. The network manager is then provided with an opportunity to take the appropriate corrective action.

The graphical user interface of the present invention, therefore, provides a network manager with the flexibility to view only those components of a network which are of current interest, and to dynamically control the illustrated information to navigate along any desired route. Consequently, the network manager can request as large, or as small, a view of the network as meets his particular needs.

Further features of the invention, as well as the advantages offered thereby, are described hereinafter with reference to specific embodiments illustrated in the accompanying drawings.

DETAILED DESCRIPTION

The present invention is directed to a graphical user interface that can be employed in connection with a variety of different types of network management models. To facilitate an understanding of the concepts which underlie the present invention, it is described hereinafter with reference to one example that is implemented in connection with the SNMP protocol used in IP-based networks, for network management. It will be appreciated, however, that the practical applications of the invention are not limited to this particular embodiment. Rather, the principles of the invention can be applied to any type of network management model which is capable of providing information about the state of the network components to a network manager.

Figure 1:
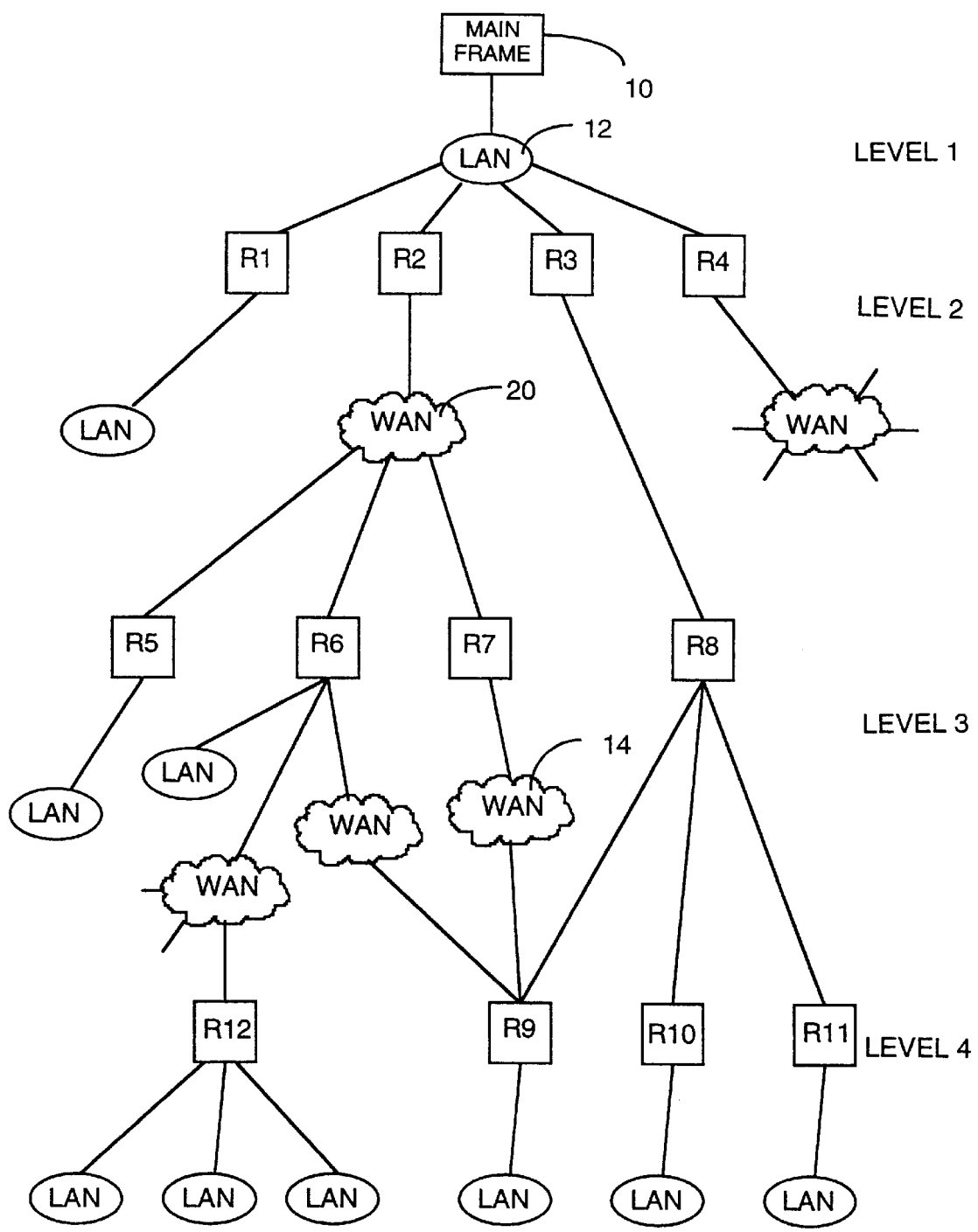
FIG. 1 is a general block diagram of the topology of an exemplary network.

An exemplary network, of the type in which the present invention can be employed, is illustrated in block diagram form in FIG. 1. Referring thereto, the illustrated network can be considered to have a hierarchial structure, consisting of several levels. Such an arrangement facilitates an understanding of the principles and operation of the invention. In a practical implementation, for example, the first level of the network might be situated within a particular building, while the second level of the network connects different buildings within a city. The third level of the network can connect various cities within a region, and the fourth level of the network might connect the different regions of an enterprise, such as an international corporation.

It will be recognized, of course, that the practical applications of the invention are not limited to networks having a hierarchical topology. Rather, other forms of networks, such as core distribution access networks, which can be represented with a concentric topology, can also benefit from the features of the invention.

The first level of the network illustrated in FIG. 1 includes a mainframe computer 10 connected to a local area network (LAN) 12. This LAN is connected to several routers R1–R4 at level 2 of the network. These routers can have one or more connections to various LANs and/or wide area networks (WANs). These various components at level 2 can be connected to additional routers R5–R8 in the third level of the network. The routers in the third level might communicate with further routers at additional levels of the network, either directly or through intervening LANs or WANs.

In general, the task of network management involves monitoring the performance of the network components, such as routers, bridges and the like, as well as the states of the connections between them, to assure the continued, reliable flow of information among the various nodes of the network, and to isolate problems when they occur. There are a number of different known techniques via which information relating to the topology and operational state of a network can be provided to a network manager. Although the particular network management model that is employed to obtain such information is not an essential feature of the present invention, one example of such a model will be described, to facilitate an understanding of the manner in which the present invention functions within such a context.

Figure 2:
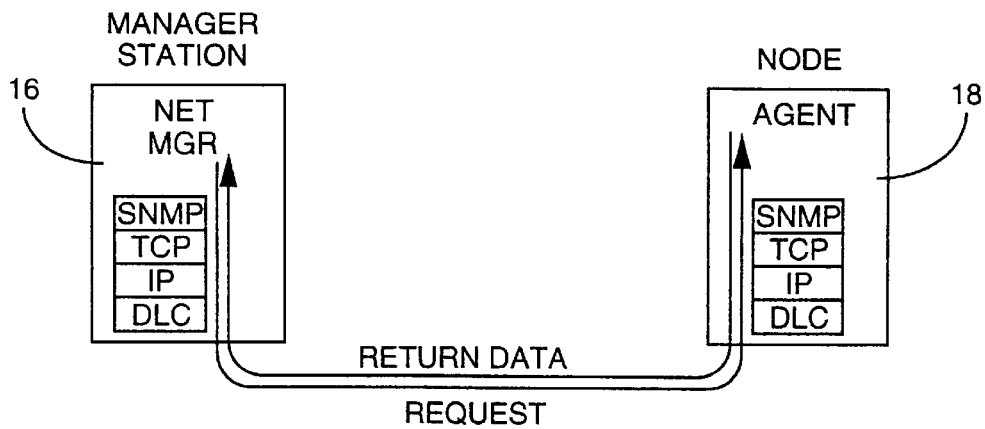
FIG. 2 is a block diagram illustrating the communication of status information between nodes on a network.

In general, communication between any two nodes in a network takes place through various network layers, having various protocols associated therewith. Referring to FIG. 2, one example of a protocol stack for communicating between two nodes in an IP-based network is illustrated. At a management station 16, a management application program, or process, may issue a request for information from various nodes on the network. The management process prepares a packet requesting such information. The packet conforms to the SNMP protocol, which is the communication protocol for the topmost, or application, layer of the network model. In a well-known manner, that packet is encapsulated within other packets having protocols that conform to successively lower layers in the network. In the illustrated example, the successive protocols comprise TCP (a transport layer protocol), IP (a network layer protocol) and DLC (a data link layer protocol). The packet may be addressed to a particular node on the network, or may be a broadcast packet, which is addressed to all nodes on the network. In the example depicted in FIG. 2, the packet is addressed to a specific node 18 which could be, for example, one of the routers in a given layer of the network. This node executes a component of the management process known as a management agent. When the request packet is received at the node, the various layers of encapsulation are stripped off in successively higher layers of the network model, until the request packet is delivered to the management agent.

Within the node 18, each of the different network layers is treated as an individual object. The management agent employs various subagents, which obtain performance data relating to operations at associated layers of the network, and return them to the agent. The agent stores this information in a suitable data structure. In response to the request from the management process, the agent program at the node 18 obtains the relevant data from the data structure, places that data in an information packet, and sends it back to the requesting station 16. At the central station 16, the management process creates a data structure, or repository, which identifies the status of the various components in the nodes of interest.

In addition to responding to requests from the management process, the individual agents can also initiate communications with the management process. For example, in the SNMP protocol, a management agent can issue a special packet known as a trap. The trap is sent from the agent to the management station 16 to indicate that something unusual has occurred at the agent's node, for example, a peer connection has gone down.

In a similar manner, other types of conventional network management application programs running on the management station can obtain information regarding the topology of the network, i.e., the identification of each component connected to components, and the interconnections between the various components, and construct a database of this information. Some of these applications include a graphical user interface that displays a map of the network topology to the network manager, for example of the type illustrated in FIG. 1.

It can be appreciated that, as the size of the network grows, the amount of information contained in such a map likewise grows, to the point where its utility is diminished. It is often the case that a network manager only has responsibility for a limited portion of the overall network, and therefore does not need to view all of the nodes in the network, and their connections. Rather, it is more useful for the network manager to view only those components of the network over which he has direct management responsibility and/or control.

In accordance with the present invention, the amount )f information provided to a network manager on the display monitor of a management station can be customized in accordance with the desires of the manager. For example, in the example of FIG. 1, a given network manager may be responsible for the operation of the wide area network 20 at level 2 in the hierarchy. Consequently, this manager may consider routers R2, R5, R6 and R7 to be the "key" routers within his area of responsibility. As such, that manager is most concerned with the operational state of the connections to these routers, and is less concerned with the other components of the overall network.

Figure 3:
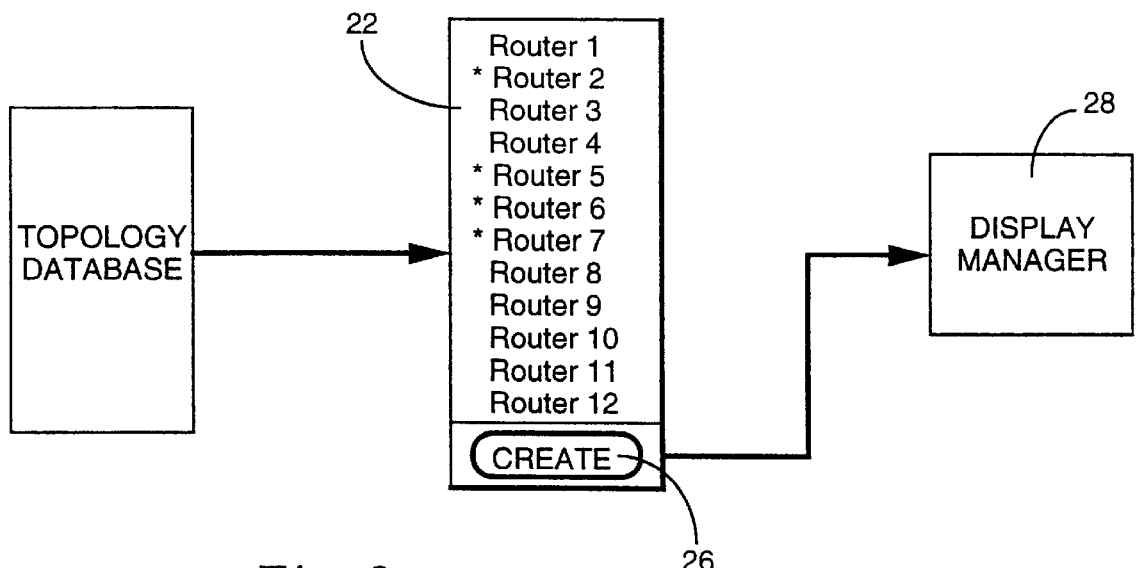
FIG. 3 is an illustration of a menu selection for network components to be displayed.

In the operation of the present invention, the network manager is provided with the ability to customize the information displayed on the monitor at the management station, so that only the key routers appear. To this end, the user interface of the present invention includes a suitable command which permits the network manager to select the key routers and create a display of only those components. Referring to FIG. 3, in response to a command from the network manager to configure a new display, a list 22 of all components that are currently connected to the network of interest is displayed on the monitor screen at the network management station. Typically, the displayed components are those which operate in accordance with a given protocol. For example, one known protocol for communicating among the nodes of a network is known as Data Link Switching, or DLSw. When a conventional network management tool, such as CiscoWorks Blue Map, constructs a repository of the topology of a network, it determines which communication protocols each component is using. Typically, the program issues a specific query to each component, which inquires whether that component is running a particular protocol, such as DLSw. In response, the queried component returns a negative or affirmative reply. From these responses, the program builds a repository of the network components and their logical connections, i.e. which ones are running the same protocol.

After this information has been assembled, the network manager can issue a command to define a new display. In one embodiment of the invention, a particular operating protocol of interest is included in the command. In response thereto, a message is sent to the network management application, requesting it to identify all of the components in the network which are operating with that protocol. The data which is returned is used to create and display a list 22 such as that shown in FIG. 3.

Once the list is displayed, the network manager can select individual components of interest. In the illustrated example, the network manager has selected routers R2, R5, R6 and R7, i.e., the "key" routers in his area of responsibility, as indicated by the asterisks adjacent their names. After all of the selections have been made, the network manager issues a suitable command, for example by actuating a "Create" button 26, to create a new display which includes the selected components. In response thereto, information pertaining to each of these components is provided to a display manager 28.

Figure 4:
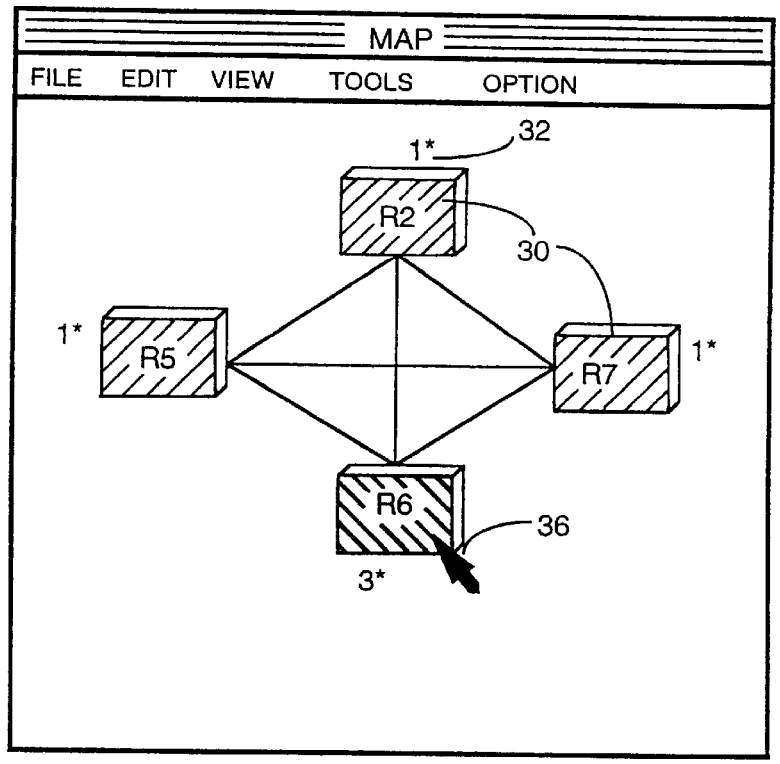
FIG. 4 is an illustration of a topology map for a limited portion of the network illustrated in FIG. 1.

Referring to FIG. 4, the display manager displays an icon 30, or other suitable form of representation, for each of the selected nodes. The display manager also illustrates the logical connections between these nodes. In this case, since they are all running the same protocol, they are all logically connected to one another. In addition to being connected amongst themselves, each of the selected nodes is also logically connected to other components which are not illustrated in the newly created map, namely components which have not been selected by the network manager but which are running the protocol of interest. To identify the fact that other, unillustrated connections are present, a suitable indicator is displayed along with each node having such a connection. In the example of FIG. 4, this indicator comprises a marker consisting of a numerical value 32 which identifies how many other connections there are, and, in this case, a star to highlight the fact that these connections lead to unillustrated components. Information regarding these connections is provided to the display manager by the network manager process, based on the topology data stored in its repository.

Figure 5A:
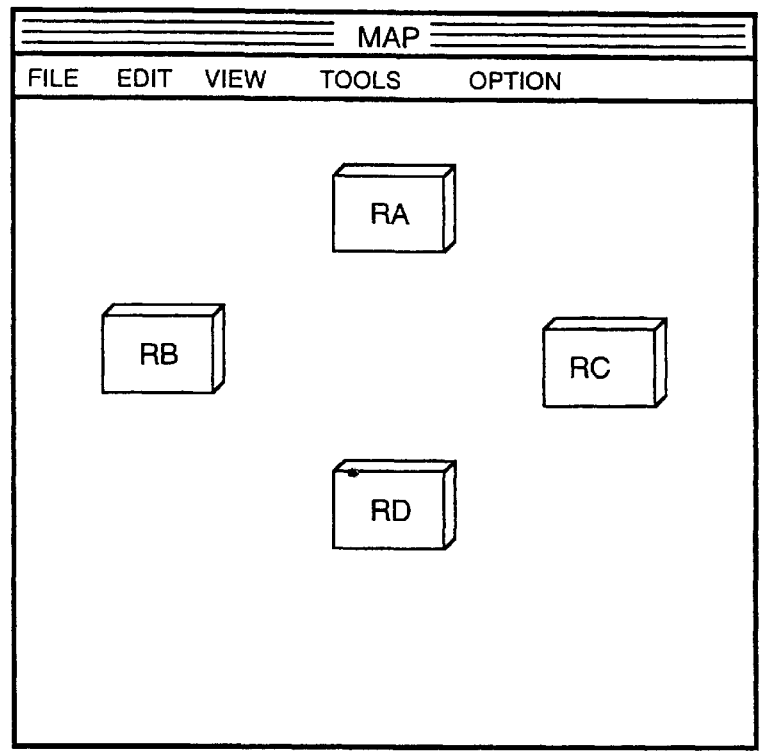
FIGS. 5A and 5B are alternative illustrations of topology maps.
Figure 5B:
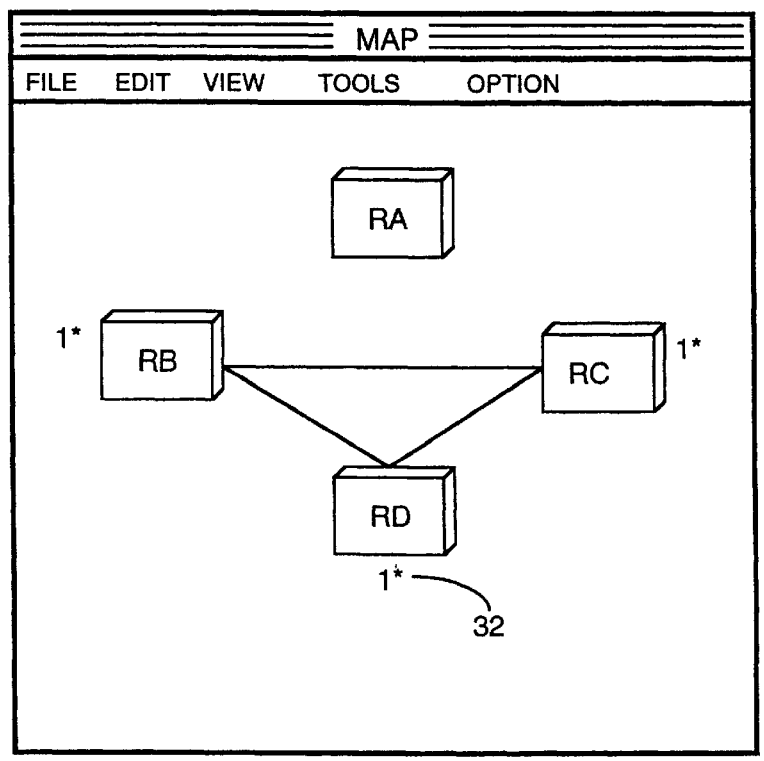

In the preceding example, the network manager specifies a desired protocol as part of the initial command to create a display. In that case, the list 22 which is presented comprises only those components which are running that particular protocol. In an alternative embodiment, the user can be provided with a list which contains all of the routers, and/or other components, in the network, regardless of the protocols they are running. From this list, the network manager can select particular components of interest. FIG. 5A illustrates an example in which the manager has selected four routers RA, RB, RC and RD for display in a map. Since a protocol has not yet been specified, no connections are shown between the routers. Subsequent to selecting the routers, the network manager specifies a protocol, e.g. RSRB. In response, the display manager draws lines between the routers which are running the protocol, as shown in FIG. 5B, to identify logical relationships between them. In this case, only three of the routers, RB, RC and RD, are running the protocol, and therefore no lines are connected to the router RA. The three routers RB, RC and RD are also logically connected to other, non-illustrated routers via the specified protocol, and therefore the marker 32 is displayed adjacent each one to indicate this fact.

The logical relationship between components need not be limited to a single protocol. For instance, the network manager may request that routers running a combination of protocols be identified, such as DLSw and RSRB, by using a Boolean "AND" connector in the naming of the protocol. In such a case, the connecting lines would only be drawn between routers which are running both protocols.

In the examples of FIGS. 4, 5A and 5B, the only components which are included in the display are routers. As shown in FIG. 1, however, other types of elements are included in the network, such as LANs which have associated architectures. If desired, a suitable dialog box (not shown) can be displayed to provide the network manager with an option to select the types of elements to be shown in the display map. Thus, depending upon the network manager's level of interest, components such as ring networks, ethernet networks, virtual LANs, and the like can be shown in addition to the key routers.

In addition to the logical relationships between components, the user interface also displays the state of the connections between components. For any given situation, the network manager will likely want to monitor certain criteria as indicators of the states of the connections. As the next step in the configuration of the network map, the network manager is provided with a list of objects that represent the various monitoring criteria. Examples of such objects include peer state, peer drops and response times. In essence, any operating parameter which can function as a metric can be employed as one of the objects. From this list, the network manager selects those which are of interest. For each selected object, the network manager can specify a threshold value which, if exceeded, represents a degradation in the state of a connection.

In the user interface, the states of the connections are indicated through an attribute associated with the displayed components. In one embodiment of the invention, this information is conveyed by means of color. The states of the connections to a particular router are determined from the information reported to the management process via the agents at the various nodes. If the connection states for a given router are within the limits set by the network manager, the icon 30 for that router can be displayed with a certain color, e.g. white. Such a condition is represented by the shading for the routers R2, R5 and R7 in FIG. 4.

The management process may receive information indicating that the connection to a node has degraded, for example a trap packet. In response to this packet, the management process determines whether one of the monitor objects identified by the user has exceeded its established threshold value. If so, the color of the icon for a displayed component which is affected by that object is changed by means of a suitable command to the display manager 28. For example, the icon may go from white to yellow, as indicated by the shading of the icon for the router R6 in FIG. 4. In such a situation, the network manager is alerted to the fact that a potential problem exists. Referring to FIG. 1, it may be the case that router R12 has gone down. Although this router is not displayed in the map of FIG. 4, the icon for router R6 changes color to alert the network manager that one of its connections has been lost.

Figure 6:
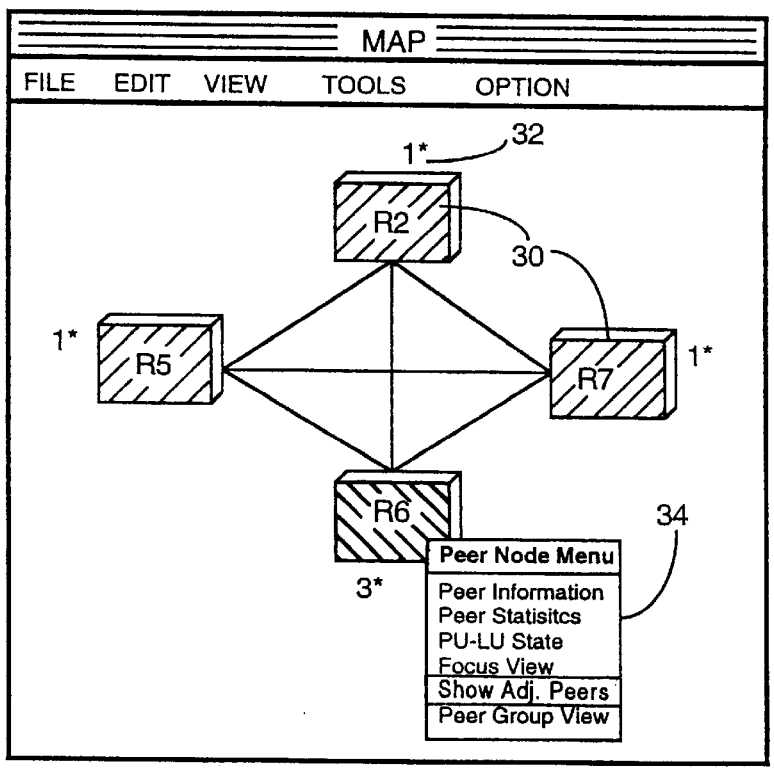
FIG. 6 is an illustration corresponding to FIG. 4, in which a user menu is displayed.
Figure 7:
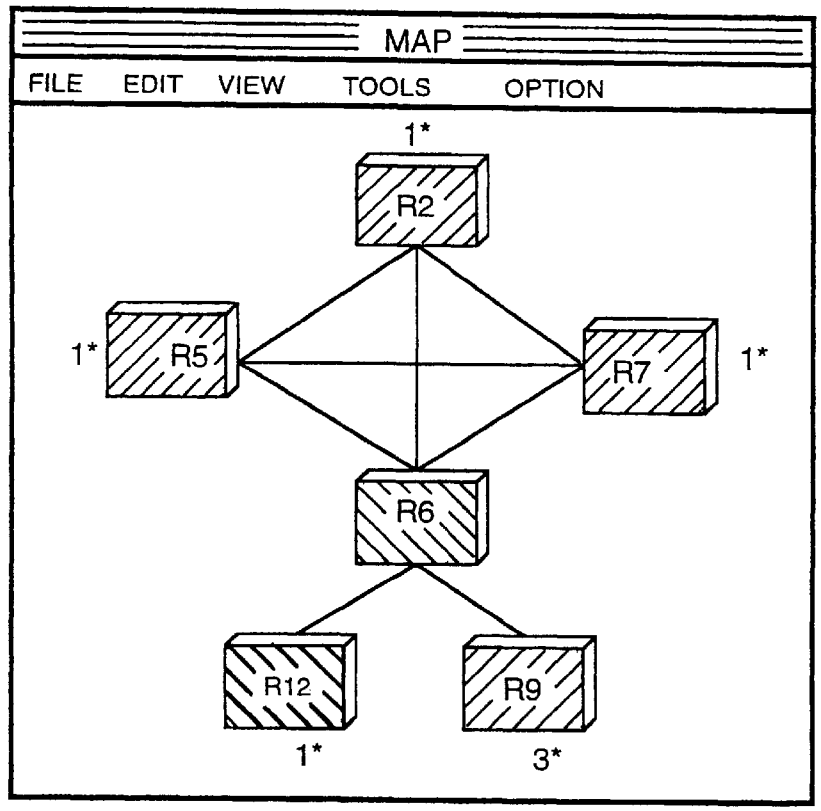
FIG. 7 is an expanded version of the topology map illustrated in FIG. 4.

In response to this situation, the network manager can expand the displayed map, in an effort to identify the source of the problem. For example, in one implementation illustrated in FIG. 6, the user might select a command from a pop-up menu 34 which causes adjacent peer routers to be displayed. The opening of the menu 34 can be initiated by clicking, or double clicking, a particular mouse button while a cursor 36 is positioned over the icon for the router of interest, as shown in FIG. 4. In response to selection of the "Show Adjacent Peers" command from this menu, the star indicator is removed from the display for that router, and all components which are directly connected to the selected router, R6, are included in the display. This result is illustrated in the map of FIG. 7. Thus, in addition to the key routers that were previously displayed, the expanded map includes additional routers R9 and R12, which are directly connected to the selected router R6. In this display, the router R12 might be illustrated with yet another color, e.g., red, to identify the fact that it has gone down. Also, these routers are displayed with starred indicators to identify the fact that they are connected to yet other, unillustrated components in the network.

Figure 8:
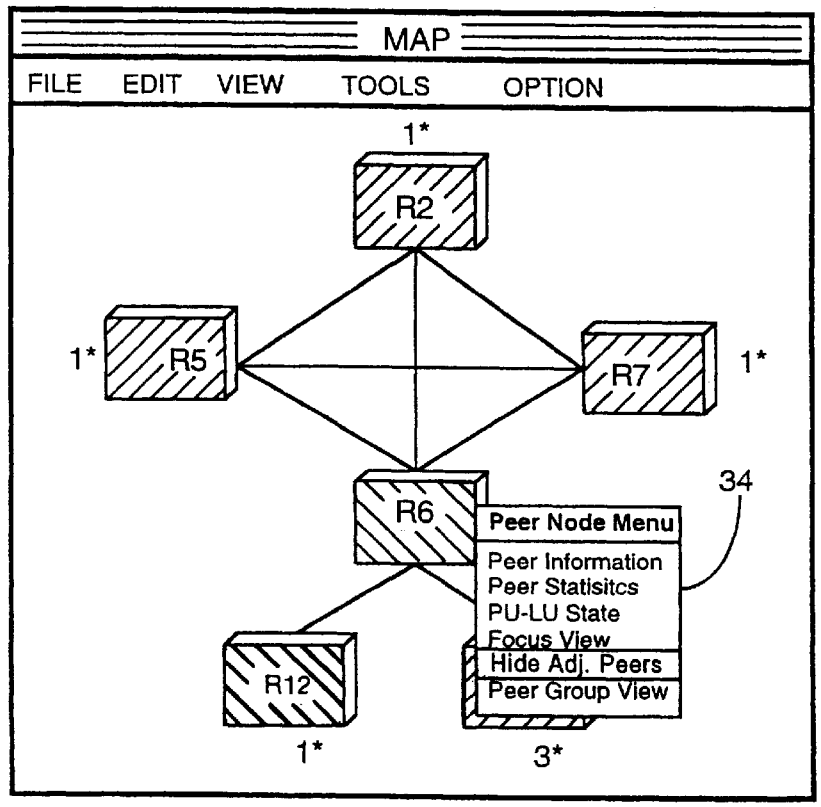
FIG. 8 is an illustration corresponding to FIG. 7, in which a user menu is displayed.

In the preceding example, the component which is the source of the connection problem, i.e., router R12, is at the next level in the network hierarchy. If, however, the problematic component resides in a level that is farther removed from the key routers, the user can continue to select displayed components in the same manner, and expand all connections thereto, until the source of the problem is identified. Similarly, when the network manager no longer desires to view certain components, e.g. after the source of a problem has been isolated, they can be selected and removed from the display. Referring to FIG. 8, if the user double-clicks on the icon for the router R6, the menu 34 is again displayed. In this case, however, since adjacent peer nodes are already visible, the menu command has toggled to 'Hide Adjacent Peers". By selecting this command, the adjacent peer routers R9 and R12 are removed from the map, to collapse the map to the view of FIG. 4. With this approach, the user can navigate through the map as necessary, to obtain a view of selected components and their connections, without having to display the entire network topology on the computer screen.

As the network manager expands and contracts the display map to illustrate components of interest, the criteria for monitoring the states of connections remain the same as those initially established by the user. Thus, the colors with which components are displayed will be determined by the thresholds established by the network manager. Once the network manager has isolated the source of a problem, it may be desirable to use a more refined set of criteria to further diagnose the problem. To do so, the network manager can switch to a focus view, which is available through another one of the commands on the popup menu 34.

Figure 9:
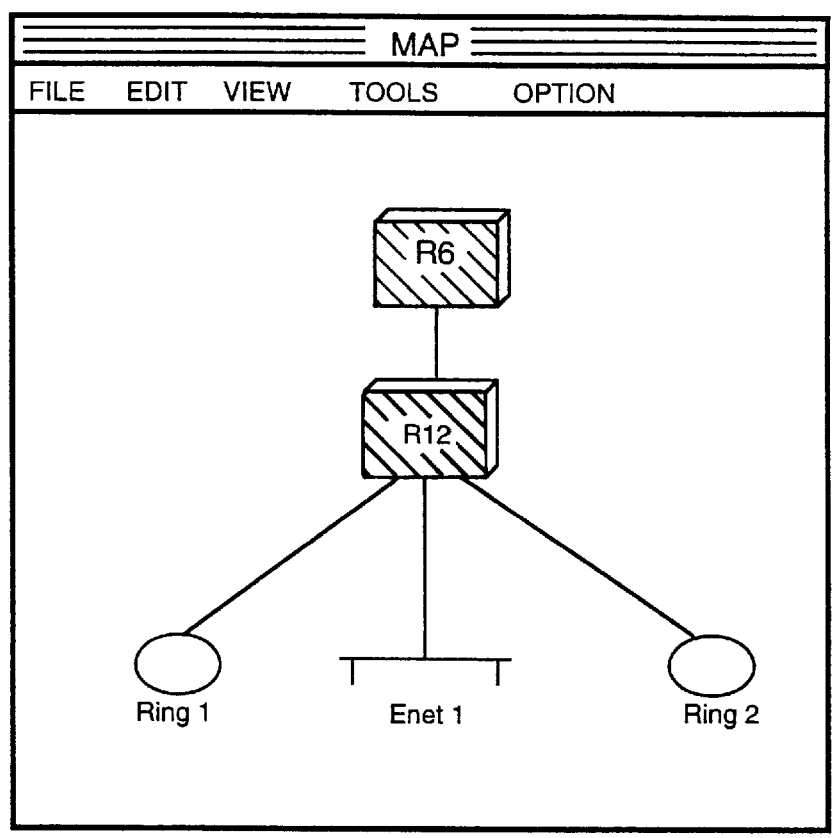
FIG. 9 is an illustration of a focus view.

An example of a focus view is illustrated in FIG. 9. The focus view differs from the network topology views of FIGS. 4–8 by virtue of the fact that a single key router is selected, in this case R12, and only the components which are directly connected to it are shown. When switching to the focus view, the network manager can define a new set of objects to be monitored, and establish different thresholds for each, to thereby provide greater resolution in the isolation of the problem. In addition, the network manager can select a new set of elements that are to be displayed along with the routers, e.g., line interfaces, LAN interfaces, etc.

From the foregoing, therefore, it can be seen that the present invention provides a graphical user interface for network management, in which the network manager can customize the amount of information displayed on a screen, to select only that information which is of current interest. In addition to the components themselves which are displayed, an aggregation of information is provided with respect to other components which are not currently displayed, as well as the status of their connections. Thus, without having to view all of the components, the network manager can be kept apprised of their relationship to illustrated components. The network manager has the ability to expand and contract the amount of displayed information associated with any illustrated component, as desired, to permit navigation of the network topology map in a manner which is most useful for the current interest of the manager.

It will be appreciated by those of ordinary skill in the art that the present invention can be embodied in other specific forms without departing from the spirit or essential characteristics thereof. For example, while color has been disclosed as the medium for indicating the status of a node and its connections, other types of indicators could be employed, such as blinking of an icon or display of an "X" over the icon. Similarly, the marker for indicating the existence of non-displayed connections to a node could take some form other than the starred numerical values which have been disclosed.

The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A graphical user interface for network management comprising:

a repository of information pertaining to components which form a computer network and connections to those components;

means for receiving a user selection of two or more of the components, which comprise less than all of the components whose information is stored in said repository; and means responsive to a user selection for displaying a topological map of the computer network comprising (a) only the selected components, (b) logical connections between the selected components, and (c) an indicator which identifies a relationship between each selected component and non-displayed components which are logically connected to the selected components.

2. The user interface of claim 1 wherein said display further comprises a second indicator which is displayed when there are logical connections of the selected components to other components of the network that are not displayed in the topological map.

3. The user interface of claim 2 wherein said second indicator includes a numerical value to indicate the number of non-displayed components to which a selected component is logically connected.

4. The user interface of claim 1 further including means responsive to user designation of one of the displayed components for expanding the topological map by displaying previously non-selected components which are logically connected to the designated component and which are logical peers of the designated component.

5. The user interface of claim 4 wherein the previously non-selected components are displayed with said indicator.

6. The user interface of claim 1 further including means responsive to user designation of one of the displayed components for switching to a different topological map which consists of only the designated component and only the components in said repository which are directly connected to the designated component.

7. A graphical user interface for network management comprising:

a repository of information pertaining to components which form a computer network and connections to those components;

means for receiving a user selection of a limited number of two or more of the components, which limited number is less than all of the components whose information is stored in said repository;

means responsive to a user selection for displaying a topological map consisting of only the selected components, connections between the selected components, and an indicator of connections to other, non-selected components; and means responsive to user designation of one of the displayed components for expanding the topological map by displaying all those previously non-selected components which are connected to the designated component.

8. The user interface of claim 7 wherein the previously non-selected components are only those which are directly connected to the designated component.

9. A graphical user interface for network management comprising:

a repository of information pertaining to components which form a computer network and connections to those components;

means for receiving a user selection of a limited number of the components, which is two or more components but less than all of the components whose information is stored in said repository;

means for receiving a user selection of one protocol that the selected components use to communicate, selected from among a plurality of protocols that the selected components may potentially use to communicate; and means responsive to a user selection for displaying a topological map comprising (a) only the selected components, (b) only logical connections between the selected components that use the selected protocol, and (c) a marker that is displayed when there are logical connections of each of the selected components to other components of the network that are not displayed in the topological map.

10. The user interface of claim 9 further including a numerical value associated with the marker to indicate the number of non-displayed components to which a selected component is logically connected.

11. The user interface of claim 9 further including means responsive to user designation of one of the displayed components for expanding the topological map by displaying previously non-selected components which are logically connected to the designated component and which are logical peers of the designated component.

12. The user interface of claim 11 wherein the previously non-selected components are displayed with said indicator.

13. A method for displaying a map of a limited portion of the topology of a computer network, comprising the steps of:

creating a repository of information pertaining to components which form the computer network and connections to those components;

receiving a selection of at least two individual components from among all the components, which comprise less than all of the components whose information is stored in said repository; and displaying a topological map comprising (a) only the selected components, (b) logical connections between only the selected components, and (c) an indicator which identifies a relationship between each selected component and non-displayed components which are logically connected to the selected components.

14. The method of claim 13 further including the step of displaying a second indicator which is displayed when there are logical connections of the selected components to other components of the network that are not displayed in the topological map.

15. The method of claim 14 wherein said second indicator includes a numerical value to indicate the number of non-displayed components to which a selected component is logically connected.

16. The method of claim 13 further including the steps of:
creating and storing one or more monitor objects that are associated with one of the components of the network, each of the monitor objects representing a performance metric of the components, each of the monitor objects having an associated stored limit value that represents the onset of an error condition for the associated performance metric;
detecting whether a monitor object exceeds its limit value; and
changing the indicator if any limit value of any of the monitor objects is exceeded.

17. The method of claim 16, further comprising the step of changing the indicator of a displayed component to a first indication when the error condition is associated with the displayed component, and changing the indicator to a second indication when the error condition is associated with a non-displayed component.

18. The method of claim 13 further including the steps of receiving a designation of one of the displayed components, and expanding the topological map by displaying only those previously non-selected components which are directly logically connected to the designated component and which are logical peers of the designated component.

19. The method of claim 18 further including the step of displaying the previously non-selected components with said indicator.

20. The method of claim 13 further including the steps of receiving a designation of one of said displayed components, and switching to a different topological map which consists of only the designated component and only the components in said repository which are directly connected to the designated component.

21. A graphical user interface as recited in claim 13, further comprising:
means for receiving a user selection of one protocol that the selected components use to communicate, selected from among a plurality of protocols that the selected components may potentially use to communicate; and
means responsive to a user selection for displaying, in the topological map, only logical connections between the selected components that use the selected protocol.

22. A method for displaying a map of a limited portion of the topology of a computer network, comprising the steps of:
creating a repository of information pertaining to components which form the computer network and connections to those components;
receiving a selection of a limited number of the components, which is two or more of the components but less than all of the components whose information is stored in said repository;
receiving a user selection of one protocol that the selected components use to communicate, selected from among a plurality of protocols that the selected components may potentially use to communicate; and
displaying a topological map comprising (a) only the selected components, (b) logical connections between only the selected components that use the selected protocol, and (c) a marker that is displayed when there are logical connections of each of the selected components to other components of the network that are not displayed in the topological map.

23. The method of claim 22 further including a numerical value in association with the marker to indicate the number of non-displayed components to which a selected component is logically connected.

24. The method of claim 22 further including the steps of receiving a designation of one of the displayed components, and expanding the topological map by displaying previously non-selected components which are logically connected to the designated component and which are logical peers of the designated component.

25. The method of claim 24 further including the step of displaying the previously non-selected components with said indicator.

26. The method of claim 22 further including the steps of
creating and storing one or more monitor objects that are associated with one of the components of the network, each of the monitor objects representing a performance metric of the components, each of the monitor objects having an associated stored limit value that represents the onset of an error condition for the associated performance metric;
detecting whether a monitor object exceeds its limit value, and changing the indicator if any limit value of any monitor object is exceeded.

27. The method of claim 26, further comprising the step of changing the indicator of a displayed component to a first indication when the error condition is associated with the displayed component, and changing the indicator to a second indication when the error condition is associated with a non-displayed component.

28. The method of claim 22 further including the steps of receiving a designation of one of said displayed components, and switching to a different topological map which consists of only the designated component and only the components in said repository which are directly connected to the designated component.

29. A method as recited in claim 13, further comprising:
receiving a user selection of one protocol that the selected components use to communicate, selected from among a plurality of protocols that the selected components may potentially use to communicate; and
in response to such user selection of the protocol, displaying, in the topological map, only logical connections between the selected components that use the selected protocol.

30. A method for displaying a map of the topology of a computer network, comprising the steps of:
creating a repository of information pertaining to components which form the computer network and connections to those components;
receiving a selection of a limited number of the components, which is less than all of the components whose information is stored in said repository;
establishing a first set of network performance criteria for monitoring the status of components which form the network and connections to those components;
displaying a first topological map comprising (a) only the selected components, (b) logical connections between only the selected components, and (c) an indicator which identifies the relationship between each selected component and non-displayed components which are logically connected to the selected components, in accordance with said first set of criteria;
designating one of the displayed components;
displaying a second topological map consisting of only the one designated component and the components in said repository which are directly connected to the designated component;

establishing a second set of network performance criteria for monitoring the status of components in said second topological map and connections to those components that is different from the first set of criteria; and displaying indicators which identify the operation status of the components in said second topological map, in accordance with said second set of criteria.

31. A method as recited in claim 30, further comprising:

receiving a user selection of one protocol that the selected components use to communicate, selected from among a plurality of protocols that the selected components may potentially use to communicate; and responsive to such user selection of a protocol, displaying, in the topological map, only logical connections between the selected components that use the selected protocol.

* * * * *